US007227535B1

(12) United States Patent
Romano et al.

(10) Patent No.: US 7,227,535 B1
(45) Date of Patent: Jun. 5, 2007

(54) KEYBOARD AND DISPLAY FOR A COMPUTER

(76) Inventors: Edwin S. Romano, 774 Galloway Crescent, Mississauga, Ontario (CA) L5C 3T9; Claudine Gabarro, 774 Galloway Crescent, Mississauga, Ontario (CA) L5C 3T9

( * ) Notice: Subject to any disclaimer, the term of this patent is extended or adjusted under 35 U.S.C. 154(b) by 491 days.

(21) Appl. No.: 10/724,553

(22) Filed: Dec. 1, 2003

(51) Int. Cl.
*G09G 5/00* (2006.01)
(52) U.S. Cl. .................... 345/168; 345/170; 345/173
(58) Field of Classification Search ........ 345/153–173; 400/475, 479, 485–489; 178/18.01; 341/22–23
See application file for complete search history.

(56) References Cited

U.S. PATENT DOCUMENTS

| | | | |
|---|---|---|---|
| 4,725,694 A | | 2/1988 | Auer et al. |
| 4,916,699 A | * | 4/1990 | Ohashi .................... 714/46 |
| D324,035 S | | 2/1992 | Izaki |
| 5,379,057 A | | 1/1995 | Clough et al. |
| 5,581,243 A | * | 12/1996 | Ouellette et al. ........... 345/173 |
| 6,271,835 B1 | | 8/2001 | Hoeksma |
| 6,396,483 B1 | * | 5/2002 | Hiller ......................... 345/173 |
| 6,429,846 B2 | | 8/2002 | Rosenberg et al. |
| 6,630,895 B1 | * | 10/2003 | Dong .......................... 341/22 |
| 6,967,831 B2 | * | 11/2005 | Chuang ..................... 361/680 |
| 2001/0040551 A1 | * | 11/2001 | Yates et al. ................ 345/156 |
| 2002/0027549 A1 | | 3/2002 | Hirshberg |
| 2002/0060669 A1 | | 5/2002 | Sze |
| 2002/0190961 A1 | | 12/2002 | Chen |
| 2003/0011576 A1 | | 1/2003 | Sandbach et al. |
| 2004/0100447 A1 | * | 5/2004 | Ozolins ...................... 345/170 |
| 2005/0057891 A1 | * | 3/2005 | Madsen et al. ............. 361/680 |
| 2006/0011461 A1 | * | 1/2006 | Chan et al. ................. 200/344 |

\* cited by examiner

*Primary Examiner*—Richard Hjerpe
*Assistant Examiner*—Mansour M. Said

(57) ABSTRACT

A keyboard and display for a computer includes a housing having a top wall, a bottom wall, a back wall, a first side wall, a second side wall, and a front wall. A processor is mounted within the housing. A plurality of keys defining a computer keyboard is positioned in the top wall and is substantially flush with the top wall. Each of the keys comprises a touch sensitive key and each is electrically coupled to the processor. A display is mounted in the top wall and is substantially flush with the top wall. The display is electrically coupled to the processor. An interface is electrically coupled to the processor and selectively coupled to the computer for communication between the processor and the computer. The computer may receive input from the plurality of keys and a video signal received from the computer may be displayed on the display.

20 Claims, 6 Drawing Sheets

US 7,227,535 B1

KEYBOARD AND DISPLAY FOR A COMPUTER

BACKGROUND OF THE INVENTION

1. Field of the Invention

The present invention relates to keyboard devices and more particularly pertains to a new keyboard device for remotely controlling a computer and displaying a display generated by the computer.

2. Description of the Prior Art

The use of keyboard devices is known in the prior art. While these devices fulfill their respective, particular objectives and requirements, the need remains for a device that utilizes the ability of wireless signals and liquid crystal display technology to allow a person to control a computer and view its display output from a remote location. Such a device should be thin and compact to allow for its versatile use.

SUMMARY OF THE INVENTION

The present invention meets the needs presented above by providing a housing having touch sensitive keys which are flush with the top wall of the housing. This reduces the profile of the housing and prevents liquids from entering the housing between the keys.

Another object of the present invention is to provide a new keyboard device that allows a user to selectively illuminate the keys so that the keys may be used in a darkened room to prevent the disturbance of a roommate by the need to increase the ambient light of a room.

Still another object of the present invention is to provide a new keyboard device that includes a LCD display which may be backlit and which positioned on the housing so that again a user may avoid disturbing a roommate by utilizing a conventional monitor which provides a large amount of light to a room.

To this end, the present invention generally comprises a housing having a top wall, a bottom wall, a back wall, a first side wall, a second side wall, and a front wall. The housing has a height from the top wall to the bottom wall less then 2½ inches. A processor is mounted within the housing. A plurality of keys defining a computer keyboard is positioned in the top wall and is substantially flush with the top wall. Each of the keys comprises a touch sensitive key and each is electrically coupled to the processor. A display is mounted in the top wall and is substantially flush with the top wall. The display is electrically coupled to the processor. An interface is electrically coupled to the processor and selectively coupled to the computer for communication between the processor and the computer. The computer may receive input from the plurality of keys and a video signal received from the computer may be displayed on the display.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
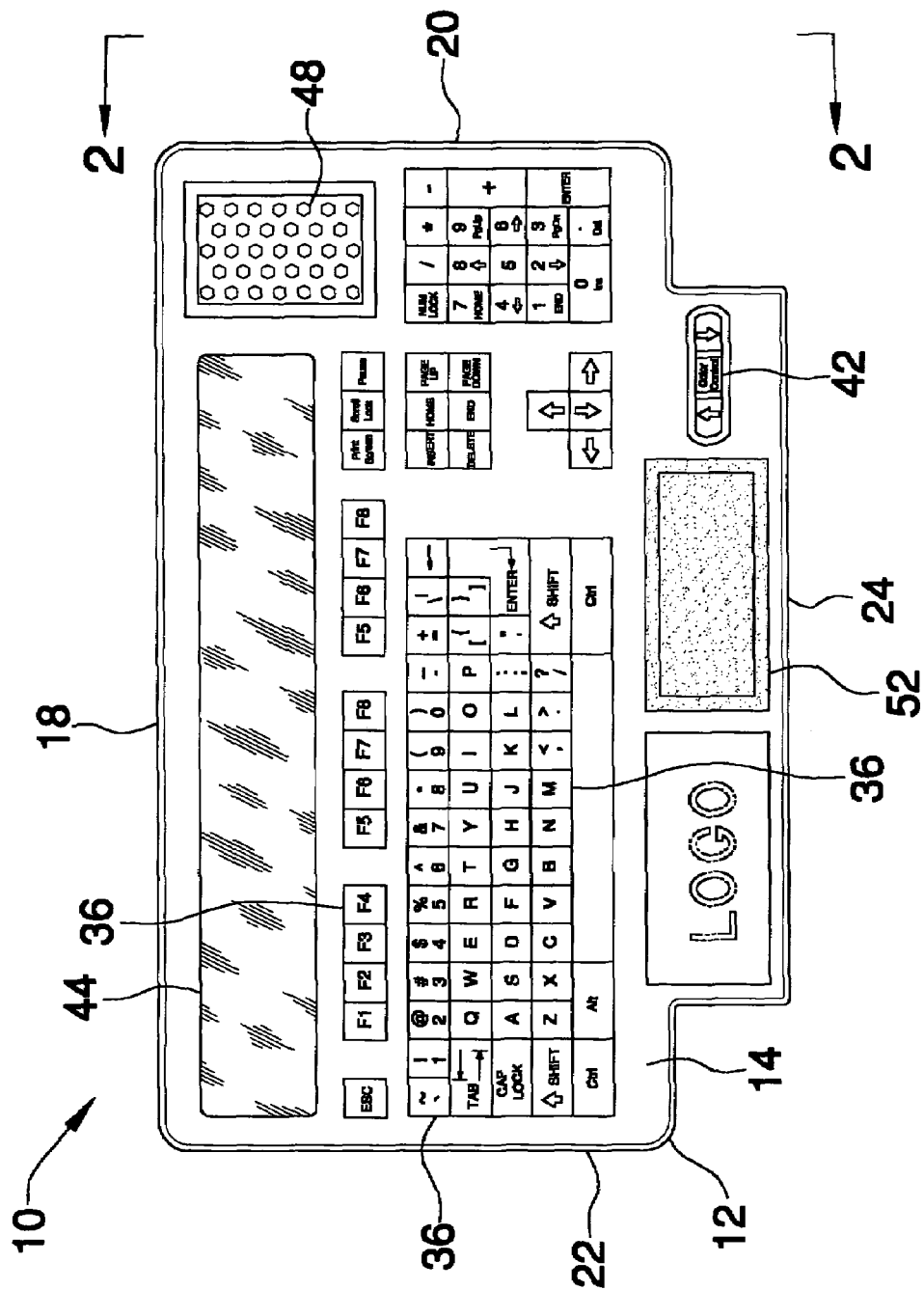
FIG. 1 is a top plan view of a keyboard and display for a computer according to the present invention.
Figure 2:
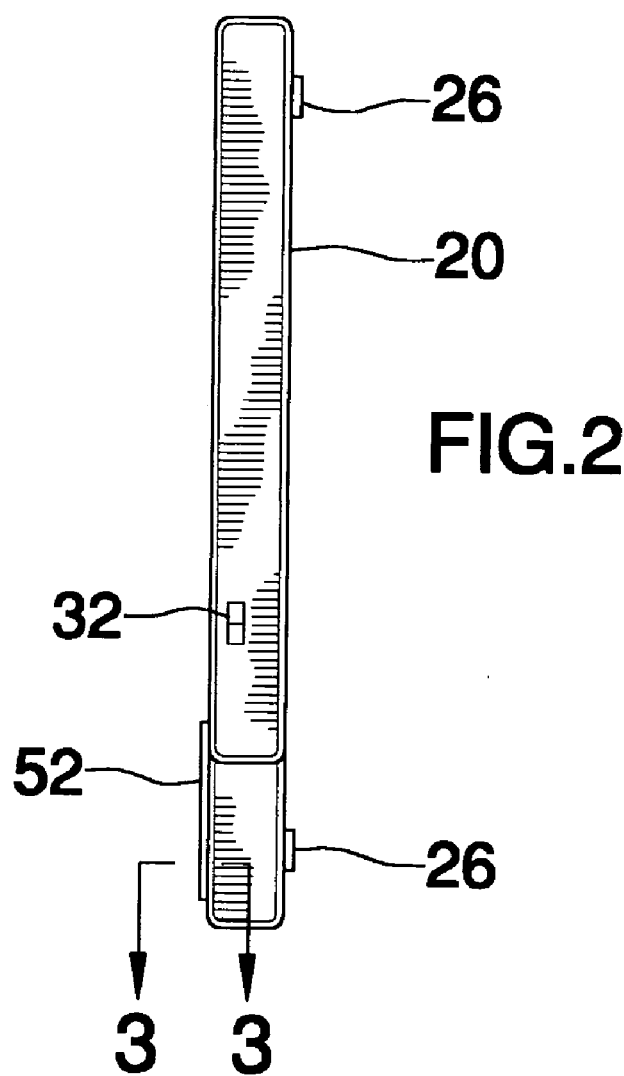
FIG. 2 is a side view of the present invention.
Figure 3:
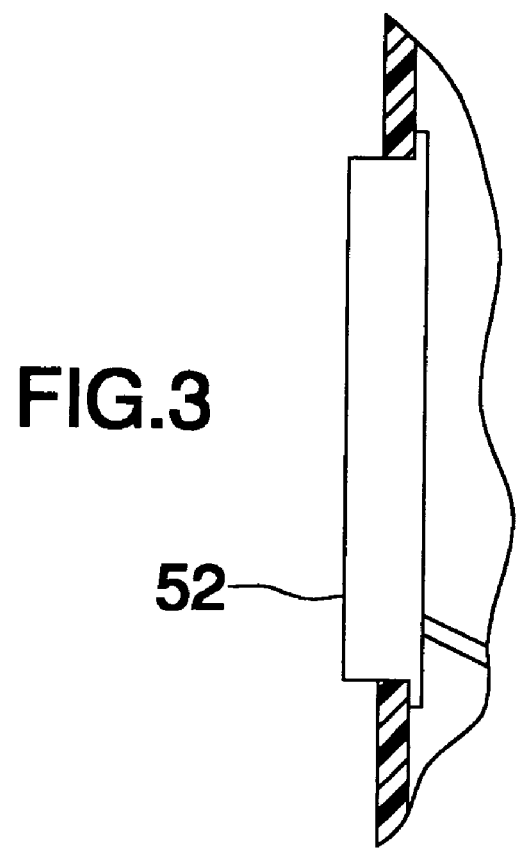
FIG. 3 is a cross-sectional view taken along line 3—3 of FIG. 2 of the present invention.
Figure 4:
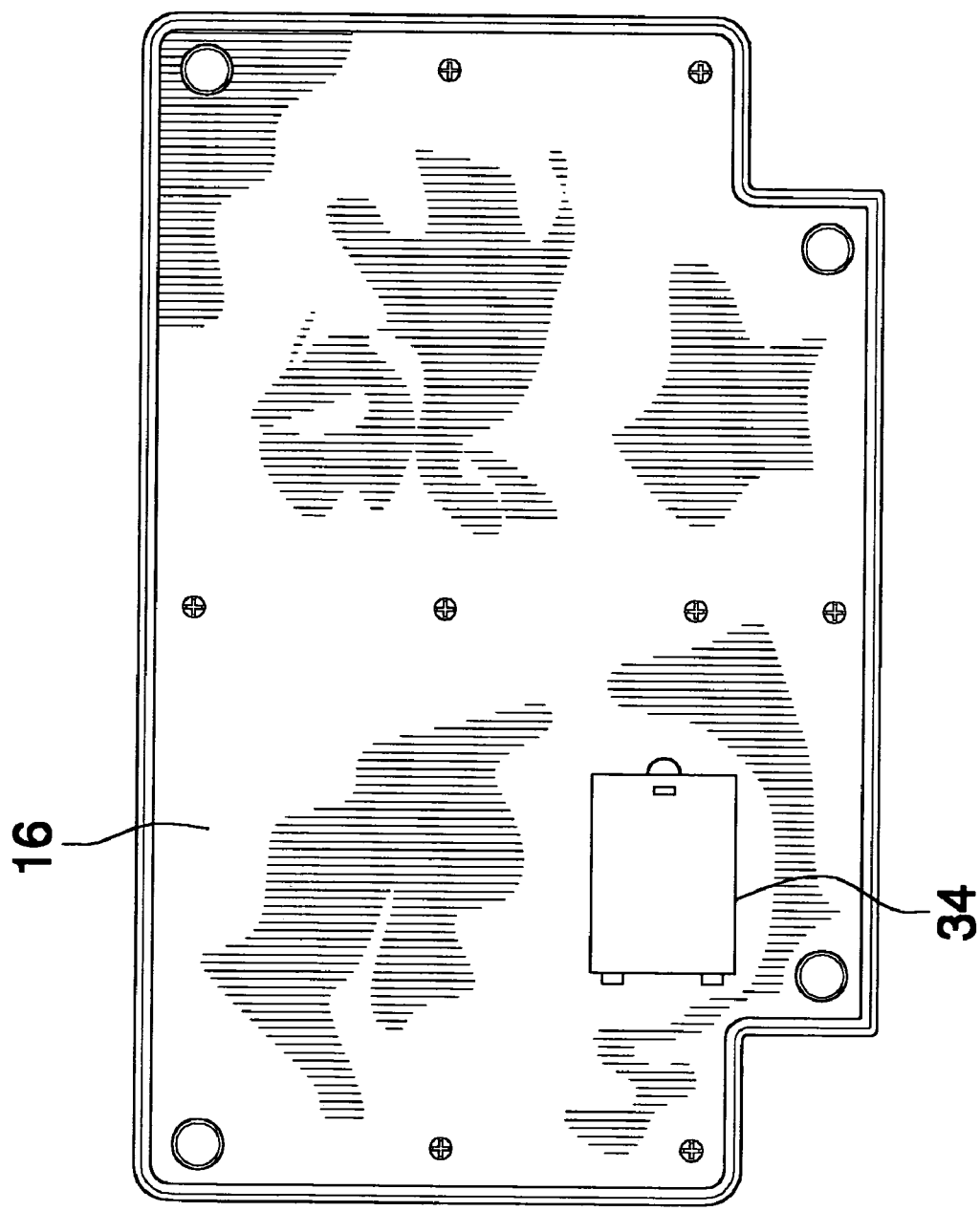
FIG. 4 is a schematic bottom view of the present invention.
Figure 5:
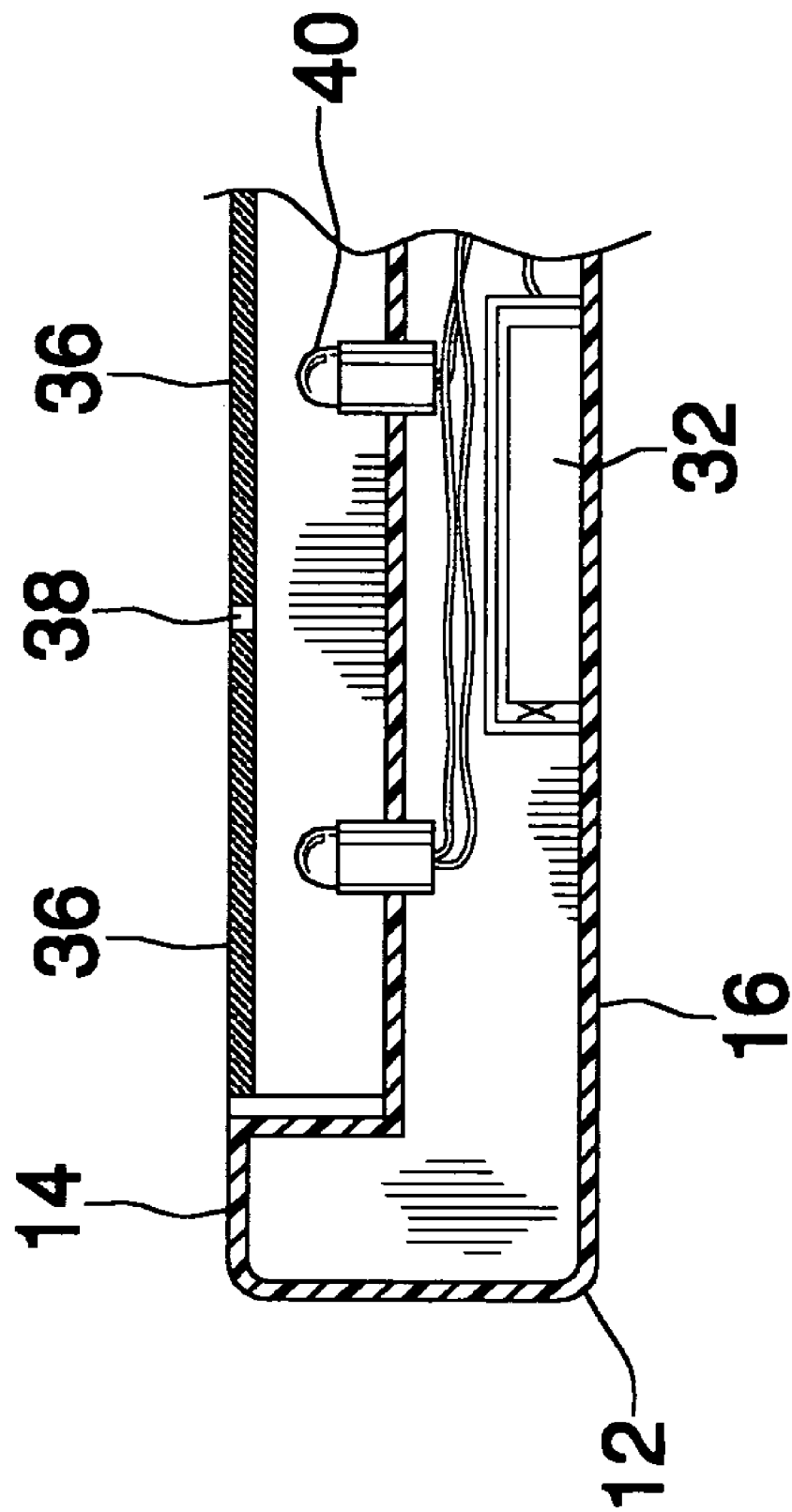
FIG. 5 is a schematic cross-sectional view of the housing of the present invention.
Figure 6:
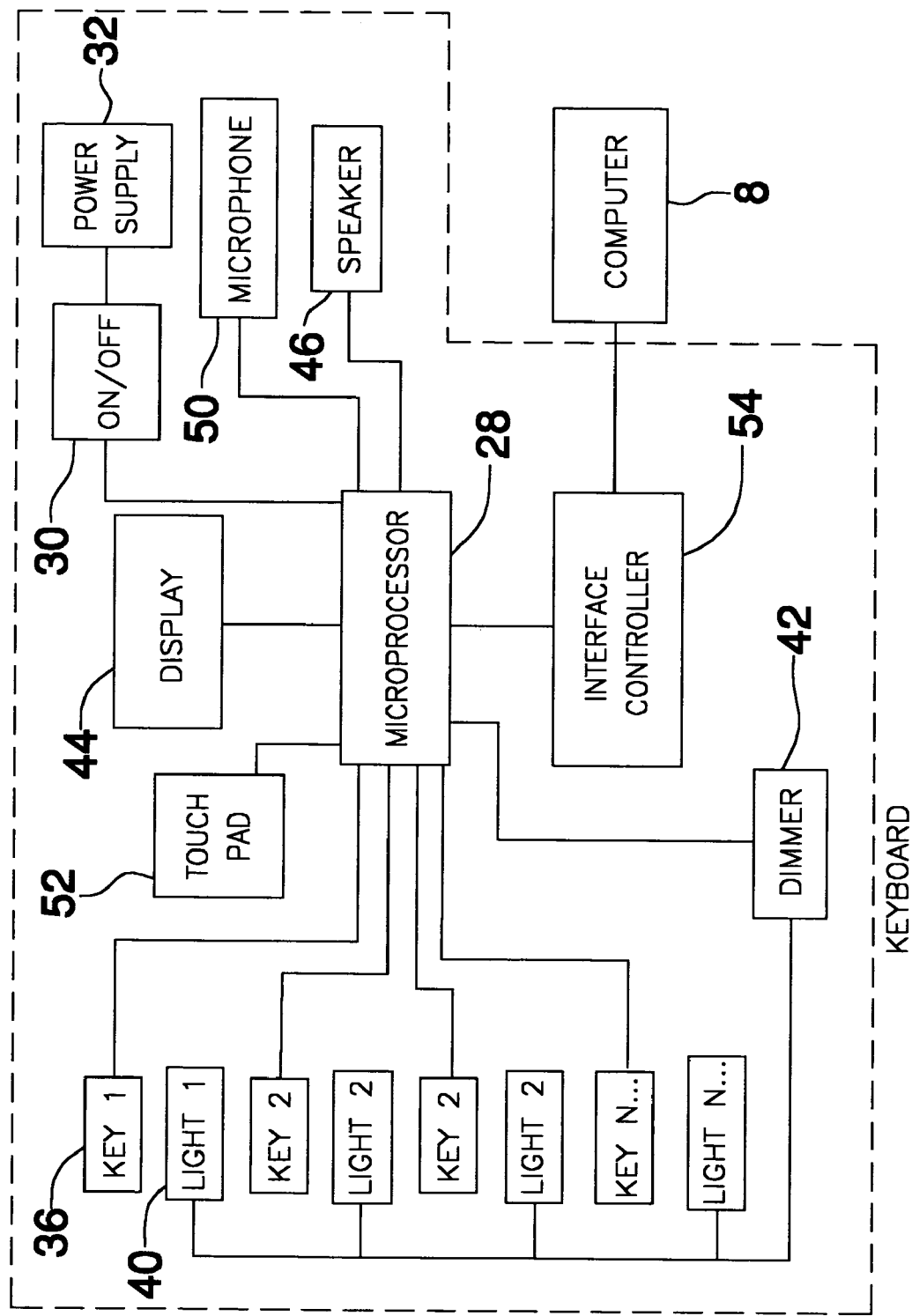
FIG. 6 is a schematic view of the present invention.
Figure 7:
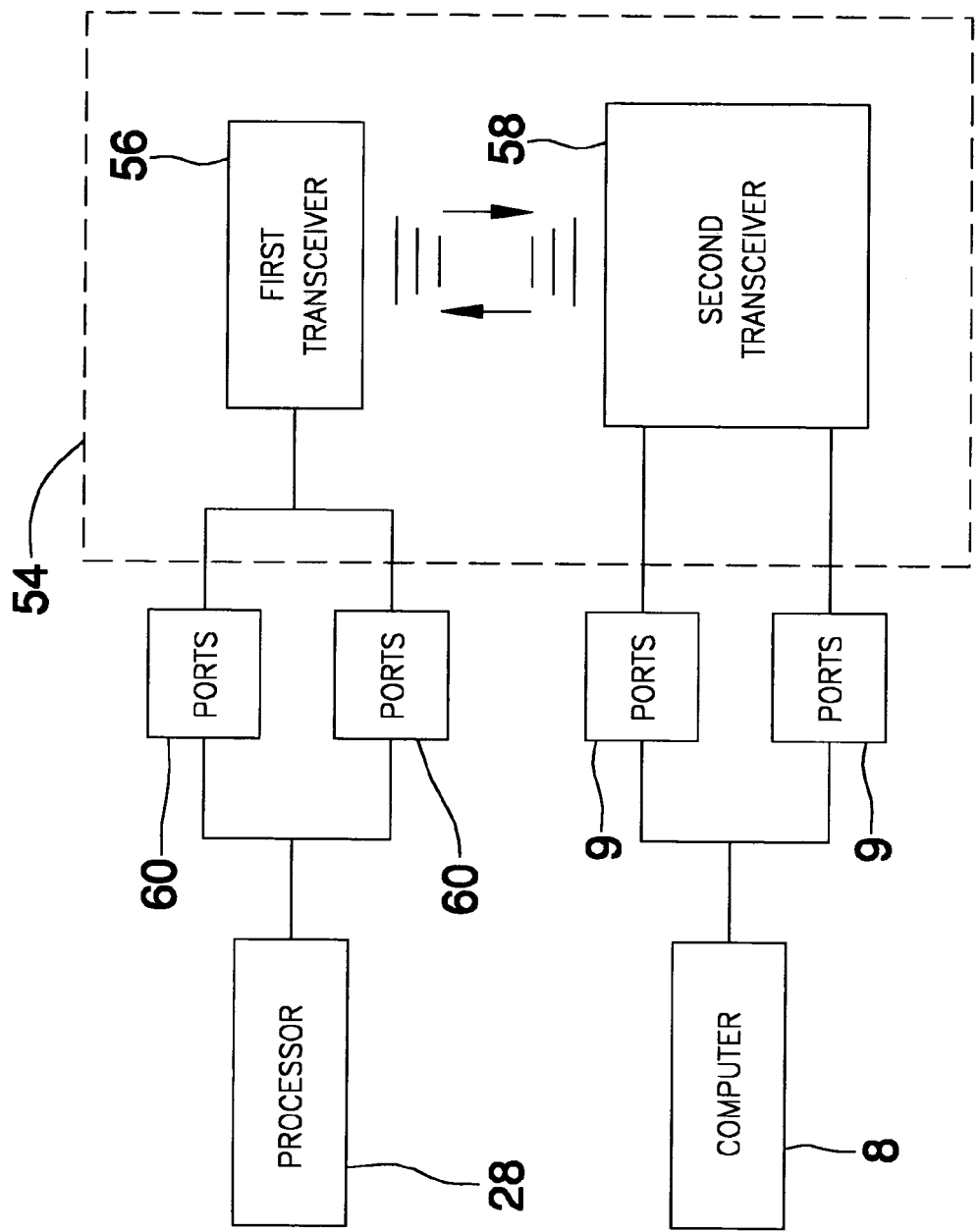
FIG. 7 is a schematic view of the interface controller of the present invention.

With reference now to the drawings, and in particular to FIGS. 1 through 7 thereof, a new keyboard device embodying the principles and concepts of the present invention and generally designated by the reference numeral 10 will be described.

As best illustrated in FIGS. 1 through 7, the keyboard and display for a computer 10 generally includes a housing 12 having a top wall 14, a bottom wall 16, a back wall 18, a first side wall 20, a second side wall 22, and a front wall 24. The housing 12 has a height from the top wall 14 to the bottom wall 16 preferably less then 2½ inches. Preferably, a plurality of resiliently compressible foot pads 26 is attached to the bottom wall.

A processor 28 is mounted within the housing 12. An actuator 30 is electrically coupled to the processor 28 for selectively supplying electricity to the processor 28. The actuator 30 is preferably mounted on the housing 12 on the first side wall 20, the second side wall 22, or the back wall 18. Power to the processor 28 may be supplied by a conventional plug or by a battery 32. Preferably, a rechargeable battery will be used which may be removably positioned in the housing 12 through a door 34 in the bottom wall 16.

A plurality of keys 36 defines a computer keyboard that is positioned in the top wall 14 and is substantially flush with the top wall. The keys 36 are those conventionally found on a computer keyboard and will be arranged in a conventional manner as found in FIG. 1. Each of the keys 36 comprises a touch sensitive key and each is electrically coupled to the processor 28. Ideally, each of the keys 36 is translucent such that they may be illuminated by light shining upwardly through them from within the housing 12. A space 38 between each of the keys and adjacently positioned keys and edges of the top wall is sealed. This may be accomplished with a plastic material and is used to stabilize the keys and also to ensure that liquid may not enter the housing through spaces between the keys 36. Such a construction is often conventional with touch sensitive keypads.

Each of a plurality of light emitters 40 is mounted within the housing 12. Each of the light emitters 40 is mounted adjacent to one of the keys 36 such that its light may illuminate the adjacent key 36. The light emitters 40 are each electrically coupled to the processor 28. Preferably, each of the light emitters 40 comprises a light-emitting diode. A control 42 is electrically coupled to the microprocessor for selectively altering the luminosity of the light emitters 40. The control 42 is mounted on the housing 12.

A display 44 is mounted in the top wall 14 and is substantially flush with the top wall 14. Ideally, the display 44 comprises a liquid crystal display that is preferably selectively backlit. The display 44 is positioned between the plurality of keys 36 and the back wall 18. A sound emitter 46 is mounted within the housing 12 and is electrically coupled to the processor 28. The top wall 14 has a grouping of apertures 48 extending therethrough. The apertures 48 are positioned adjacent to the sound emitter 46. Additional sound emitters 46, or speakers, may be added positioned within the housing 12. Additionally, a microphone 50 may also be positioned in the housing for receiving sound input from a user of the device. The microphone 50 is electrically coupled to the processor 28.

A touch pad 52 is mounted in the top wall 14. The touch pad 52 is operationally coupled to the processor 28 and is preferably positioned between the plurality of keys 36 and the front wall 24. The touch pad is a conventional touch pad used with portable laptop computers for mouse functions.

An interface 54 is electrically coupled to the processor 28 and is selectively coupled to a computer 8 for communication between the processor 28 and the computer 8. The interface 54 may include a cable having conventional connectors and would generally include a port on the housing for receiving a first end of the cable and the second end of the cable would have one or two couplers for coupling to the keyboard input and the video and sound outputs of the computer. However, it is preferred that the combination of the present device utilizes a wireless signal such 802.11b or 8702.11g. The interface 54 then includes a first transceiver 56 and a second transceiver 58 each adapted for sending and receiving wireless transmissions. The first transceiver 56 is electrically coupled, or hardwired, to the processor 28. This may be done through ports 60 to the processor. The second transceiver 58 would use conventional outputs and inputs to couple to the existing input and output ports 9 of the computer 8 so that it would be removably electrically coupled to the computer 8.

In use, the device is used with a conventional desk top computer in a manner that allows the user to the computer in a darkened room in an area spaced from the computer where cables connecting a keyboard to the computer would not be practical. The user uses the combination as a conventional keyboard and mouse for inputting information to the computer from the plurality of keys. A video and/or sound signal is then transferred back to the combination from the computer via the transceivers so that the display displays what a conventional monitor would display and to allow the speakers to emit any sounds that would normally be played by speakers coupled to the computer. The combination gives the functionality of a laptop in a very small design and allows the user to utilize the desk top computer while having the ability to move away from the desk top computer.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A computer input and display combination for selectively coupling to a computer, said combination including:
    a housing having a top wall, a bottom wall, a back wall, a first side wall, a second side wall, and a front wall, said housing having a height from said top wall to said bottom wall less than 2½ inches;
    a processor being mounted within said housing;
    a plurality of keys defining a computer keyboard being positioned in said top wall and being substantially flush with said top wall, each of said keys comprising a touch sensitive key, each of said keys being electrically coupled to said processor, each of said keys being translucent;
    a plurality of light emitters being mounted within said housing, each of said light emitters being mounted adjacent to one of said keys, each of said light emitters being electrically coupled to said processor;
    a display being mounted in said top wall and being substantially flush with said top wall, said display being electrically coupled to said processor;
    an interface being electrically coupled to said processor and selectively coupled to the computer for communication between said processor and the computer; and
    input from said plurality of keys being received by said computer and a video signal received from the computer being displayed on said display.

2. The combination according to claim 1, further including a plurality of resiliently compressible foot pads being attached to said bottom wall.

3. The combination according to claim 1, wherein each of said light emitters comprises a light-emitting diode.

4. The combination according to claim 1, wherein a space between each of said keys and adjacently positioned keys and edges of the top wall is sealed.

5. The combination according to claim 1, further including a control being electrically coupled to said microprocessor for selectively altering a luminosity of said light emitters, said control being mounted on said housing.

6. The combination according to claim 1, wherein said display comprises a liquid crystal display.

7. The combination according to claim 6, said display being selectively backlit.

8. The combination according to claim 1, wherein said display is positioned between said plurality of keys and said back wall.

9. The combination according to claim 1, further including a sound emitter being mounted within said housing and being electrically coupled to said processor, said top wall having a grouping of apertures extending therethrough, said apertures being positioned adjacent to said sound emitter.

10. The combination according to claim 1, further including a touch pad being mounted in said top wall, said touch pad being operationally coupled to the processor.

11. The combination according to claim 1, wherein said interface including a first transceiver and a second transceiver each adapted for sending and receiving wireless transmissions, said first transceiver being electrically coupled to said processor, said second transceiver being removably electrically coupled to the computer.

12. A computer input and display combination for selectively coupling to a computer, said combination including:

a housing having a top wall, a bottom wall, a back wall, a first side wall, a second side wall, and a front wall, said housing having a height from said top wall to said bottom wall less than 2½ inches;

a plurality of resiliently compressible foot pads being attached to said bottom wall;

a processor being mounted within said housing;

an actuator being electrically coupled to said processor for selectively supplying electricity to said processor;

a plurality of keys defining a computer keyboard being positioned in said top wall and being substantially flush with said top wall, each of said keys comprising a touch sensitive key, each of said keys being electrically coupled to said processor, each of said keys being translucent, a space between each of said keys and adjacently positioned keys and edges of the top wall being sealed;

a plurality of light emitters being mounted within said housing, each of said light emitters being mounted adjacent to one of said keys, each of said light emitters being electrically coupled to said processor, each of said light emitters comprising a light-emitting diode;

a control being electrically coupled to said microprocessor for selectively altering a luminosity of said light emitters, said control being mounted on said housing;

a display being mounted in said top wall and being substantially flush with said top wall, said display being electrically coupled to said processor, said display comprising a liquid crystal display, said display being backlit, said display being positioned between said plurality of keys and said back wall;

a sound emitter being mounted within said housing and being electrically coupled to said processor, said top wall having a grouping of apertures extending therethrough, said apertures being positioned adjacent to said sound emitter;

a touch pad being mounted in said top wall, said touch pad being operationally coupled to the processor, said touch pad being positioned between said plurality of keys and said front wall;

an interface being electrically coupled to said processor and selectively coupled to the computer for communication between said processor and the computer, said interface including a first transceiver and a second transceiver each adapted for sending and receiving wireless transmissions, said first transceiver being electrically coupled to said processor, said second transceiver being removably electrically coupled to the computer; and input from said plurality of keys and said touch pad being received by said computer, a video signal received from the computer being displayed on said display and a sound signal received from the computer being played by said sound emitter.

13. A computer input and display combination for selectively coupling to a computer, said combination including:

a housing having a top wall, a bottom wall, a back wall, a first side wall, a second side wall, and a front wall, said housing having a height from said top wall to said bottom wall less than 2½ inches;

a processor being mounted within said housing;

a plurality of keys defining a computer keyboard being positioned in said top wall and being substantially flush with said top wall, each of said keys comprising a touch sensitive key, each of said keys being electrically coupled to said processor;

a display being mounted in said top wall and being substantially flush with said top wall, said display being electrically coupled to said processor;

an interface being electrically coupled to said processor and selectively coupled to the computer for communication between said processor and the computer;

a sound emitter being mounted within said housing and being electrically coupled to said processor, said top wall having a grouping of apertures extending therethrough, said apertures being positioned adjacent to said sound emitter; and input from said plurality of keys being received by said computer and a video signal received from the computer being displayed on said display.

14. The combination according to claim 13, wherein each of said keys is translucent and said combination further includes a plurality of light emitters being mounted within said housing, each of said light emitters being mounted adjacent to one of said keys, each of said light emitters being electrically coupled to said processor.

15. The combination according to claim 14, wherein each of said light emitters comprises a light-emitting diode.

16. The combination according to claim 14, further including a control being electrically coupled to said microprocessor for selectively altering a luminosity of said light emitters, said control being mounted on said housing.

17. The combination according to claim 13, wherein a space between each of said keys and adjacently positioned keys and edges of the top wall is sealed.

18. The combination according to claim 13, wherein said display comprises a liquid crystal display.

19. The combination according to claim 13, further including a touch pad being mounted in said top wall, said touch pad being operationally coupled to the processor.

20. The combination according to claim 13, wherein said interface includes a first transceiver and a second transceiver each adapted for sending and receiving wireless transmissions, said first transceiver being electrically coupled to said processor, said second transceiver being removably electrically coupled to the computer.

* * * * *